United States Patent
Nizhegorodov

(10) Patent No.: US 7,032,216 B1
(45) Date of Patent: Apr. 18, 2006

(54) NATIVE COMPILATION AND SAFE DEPLOYMENT OF VIRTUAL MACHINE CODE

(75) Inventor: Dmitry Nizhegorodov, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 688 days.

(21) Appl. No.: 09/792,070

(22) Filed: Feb. 26, 2001

Related U.S. Application Data

(60) Provisional application No. 60/185,134, filed on Feb. 25, 2000.

(51) Int. Cl.
*G06F 9/45* (2006.01)

(52) U.S. Cl. .................. 717/152; 717/140; 717/151

(58) Field of Classification Search .............. 717/152, 717/140, 151
See application file for complete search history.

(56) References Cited

U.S. PATENT DOCUMENTS

| | | | | |
|---|---|---|---|---|
| 6,078,744 A | * | 6/2000 | Wolczko et al. ............ | 717/153 |
| 6,110,226 A | * | 8/2000 | Bothner ...................... | 717/153 |
| 6,289,506 B1 | * | 9/2001 | Kwong et al. .............. | 717/148 |
| 6,289,512 B1 | * | 9/2001 | Edwards et al. ............ | 717/178 |
| 6,349,344 B1 | * | 2/2002 | Sauntry et al. ............. | 719/332 |
| 6,484,313 B1 | * | 11/2002 | Trowbridge et al. ....... | 717/146 |
| 6,742,006 B1 | * | 5/2004 | Raduchel et al. .......... | 707/200 |

OTHER PUBLICATIONS

Barr, Michael, Frank, Brian, "Java: Too Much for Your System?", p. 1-7, 1997, www.netrino.com/Articles/EmbeddedJava, retrieved from google.com search Mar. 8, 2004.*

Bothner, Per, "A Gcc-based JAVA Implementation", p. 174-178, 1997 IEEE, retrieved from IEEE database Mar. 8, 2004.*

Cierniak, Michal, Li, Wei, "Briki: an Optimizing JAVA complier", p. 179-184, 1997 IEEE, retrieved from IEEE dtabase 3/08/200.*

(Continued)

*Primary Examiner*—Tuan Dam
*Assistant Examiner*—Mary Steelman
(74) *Attorney, Agent, or Firm*—Hickman Palermo Truong & Becker LLP

(57) ABSTRACT

Fragile native compilation of virtual machine code is described, in which a native code optimizer inspects external code entities such as Java base classes and emits target code based on an inter-procedural analysis of the code and data structure invariants and other properties of the external code entity. The fragile compiler also records which properties of the external code entities were used to produce the optimized code in a "fragile set", so that the virtual machine at which the compiled code is deployed and executed can detect if the recorded properties of the external code entities are compatible with the properties of the corresponding entities on the deployment virtual machine. If the code entities are incompatible, the compiled native code is rejected and the virtual machine reverts to interpreting the virtual machine code.

22 Claims, 4 Drawing Sheets

OTHER PUBLICATIONS

Fitzgerald, Robert, Knoblock, Todd B., Ruf, Erik, Steensgaard, Bjame, Tarditi, David, "Marmot: An Optimizing Compiler for JAVA", Microsoft Research Technical Report MSR-TR-99-33, pp. 1-27, 1999, retrieved from citeseer.com Mar. 10, 2004.*

Hsieh, Cheng-Hsueh A., Gyllenhaal, John C, Hwu, Wen-mei., "Java Bytecode to Native Code Translation: The Caffeine Prototype and Preliminary Results", 1996 IEEE, p. 1-8, retrieved from IEEE database Mar. 10, 2004.*

Hsieh, Cheng-Hsueh A., Conte, Marie T., Johnson, Teresa L., Gyllenhaal, John C., Hwu, Wen-mei W., "Optimizing NET Compilers for Improved JAVA Performance", p. 67-75, Jun. 1997, IEEE, retrieved from IEEE database Mar. 10, 2004.*

Kienle, Holger, "j2s: A SUIF JAVA Compiler", Technical Report TRCS98-18, Computer Science Department, University of California, Santa Barbara, 1998, retrieved from google.com search Mar. 10, 2004.*

Mathew, Smith, Dahlman, Eric, and Gupta, Sandeep, "Compiling JAVA to SUIF: Incorporating Support for Object-Oriented Languages", Jul. 1997, p. 1-19, Technical Report CS-97-114, CS Dept Colorado State Univ, retireved google.com Mar. 10, 2004.*

Proebsting, Todd A., Townsend, Gregg, Bridges, Patrick, Hartman, John H., Newsham, Tim, Watterson, Scott A., "Toba: JAVA for Applications A Way Ahead of Time (WAT) Compiler", p. 1-13, Jun. 1997, The Uniy of Arizona, retrieved from google.com Mar. 10, 2004.*

Weiss, Mi., de Ferriere, F., Delsart, B, Fabre, C, Hirsch, F, Johnson, E. A., Joloboff, V, Roy,F, Siebert, F., Spengler, X., "Turbo a bytecode-to-Native Compiler", 1998, p. 114-125, citeseer.com, retrieved Mar. 10, 2004.*

"Wind River Systems Introduces Personal JWorks and WindPower TurboJ", Feb. 1999, retrieved from google.com Mar. 10, 2004.*

Microsoft Computer Dictionary, Fifth Edition, pp. 97 and 293 (checksum and JAR). 2002.*

* cited by examiner

NATIVE COMPILATION AND SAFE DEPLOYMENT OF VIRTUAL MACHINE CODE

RELATED APPLICATIONS

The present application claims the benefit of U.S. Provisional Patent Application Ser. No. 60/185,134, entitled "Native Compilation of Java" filed on Feb. 25, 2000 by Dmitry Nizhegorodov, the contents of which are hereby incorporated by reference.

FIELD OF THE INVENTION

The present invention relates to computer systems and more particularly to native compilation of virtual machine code.

BACKGROUND OF THE INVENTION

The main goal of native compilation of virtual machine code is to boost performance of programs written in a computer language that is implemented on a virtual machine. A virtual machine is an abstract computing machine that is simulated on a real computing machine, and, like a real computing machine, a virtual machine has an instruction set and manipulates various memory areas at run time. Currently, the JAVA programming language is one of the most popular programming languages that are implemented on a virtual machine; other examples include the SMALLTALK-80 programming language and the UCSD Pascal programming language.

Programming languages that are implemented on a virtual machine have many advantages over programming languages that are compiled into native code, which is executed directly by a particular hardware platform. Because the virtual machine is abstract and capable of simulation on a variety of different computing platforms, virtual machine code is highly portable and can be run on the different computing platforms without modification, simply by interpreting the virtual machine code instructions one at a time. The portability advantage of virtual machine code, however, comes at a cost, because interpretation of virtual machine code is typically much slower than directly executing equivalent native code. Accordingly, there has been much interest in compiling virtual machine code into native code and executing that native code to boost performance.

One approach to native compilation is known as "just-in-time" compilation, in which native code is generated only until when the virtual machine code is about to be executed at run-time. Just-in-time compilation can profitably be used by identifying performance-critical spots and compiling these critical code fragments. Because compilation overhead in just-in-time compilation contributes to the combined run-time execution cost, just-in-time compilers must carefully limit the scope of the code that is subject to compilation. For example, just-in-time compilers typically limit the scope of their analysis to one Java method or other kind of routine at a time. This restriction, however, limits the opportunities for some of the most important code optimizations, which require inter-procedural code inspection. Another disadvantage of just-in-time compilation occurs in the context of server-side execution. Just-in-time compilation adversely affects scalability unless the dynamically generated native code can be shared among independent user sessions, which is a difficult problem to solve.

Unlike just-in-time compilation, "ahead-of-time" compilation does not consume critical run-time resources, because the virtual machine code is compiled well before the program is invoked by a user. Ahead-of-time compilers are able to do inter-procedural optimization analysis, in which the entire application is analyzed to identify code optimizations. In server-side execution environments, ahead-of-time compilation is an attractive option because the resulting native code can be shared among different users, thereby improving scalability.

Accordingly, ahead of time compilers are increasingly being used as a way to deploy complete, frozen Java solutions, achieving high performance by applying various code optimizations. Most such tools are "monolithic" compilers, which assume that the transitive closure of the compiled classes is determined and fixed at compile time. Thus, these monolithic compilers cannot interact with the Java interpreter and, in fact, break the semantics of the Java virtual machine. For example, most monolithic compilers derive their high performance from freezing layouts of Java instances and virtual tables. However, freezing instance and virtual table layouts violates Java virtual machine semantics, because updates to Java classes on the virtual machine are not reflected in the frozen, monolithically compiled application.

Therefore, there is a need for a native compilation technology that does not incur the run-time execution costs of just-in-time compilers while avoiding the violation of virtual machine semantics suffered by ahead-of-time monolithic compilers.

SUMMARY OF THE INVENTION

This and other needs are addressed by the present invention by providing "fragile" native compilation of virtual machine code. In fragile compilation, the native code optimizer inspects external code entities such as Java base classes and emits target code based on an inter-procedural analysis of the code and data structure invariants and other properties of the external code entity. The fragile compiler also records which properties of the external code entities were used to produce the optimized code in a "fragile set", so that the virtual machine at which the compiled code is deployed and executed can detect if the recorded properties of the external code entities are compatible with the properties of the corresponding entities on the deployment virtual machine. If the code entities are incompatible, the compiled native code is rejected and the virtual machine reverts to interpreting the virtual machine code.

Accordingly, one aspect of the present invention relates to a method and software for compiling virtual machine code into native code, including optimizing the native code based on a property of an external virtual machine entity that is outside of the virtual machine code. An indication of the external virtual machine entity is recorded (e.g. in a "fragile set") and instructions for deploying the native code are constructed based on the recorded indication of the external virtual machine entity.

Another aspect of the present invention pertains to a method and software for loading a native code module from a deployment module into a run-time environment executing virtual machine code. The methodology includes determining whether the native code is compatible with an external virtual machine entity that is included in the virtual machine code in the run-time environment. If the native code is compatible, then the native code is loaded into the run-time environment, but if the native code is not compatible, then the native code is rejected.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for native compilation of virtual machine code are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

SYSTEM OVERVIEW

Figure 1:
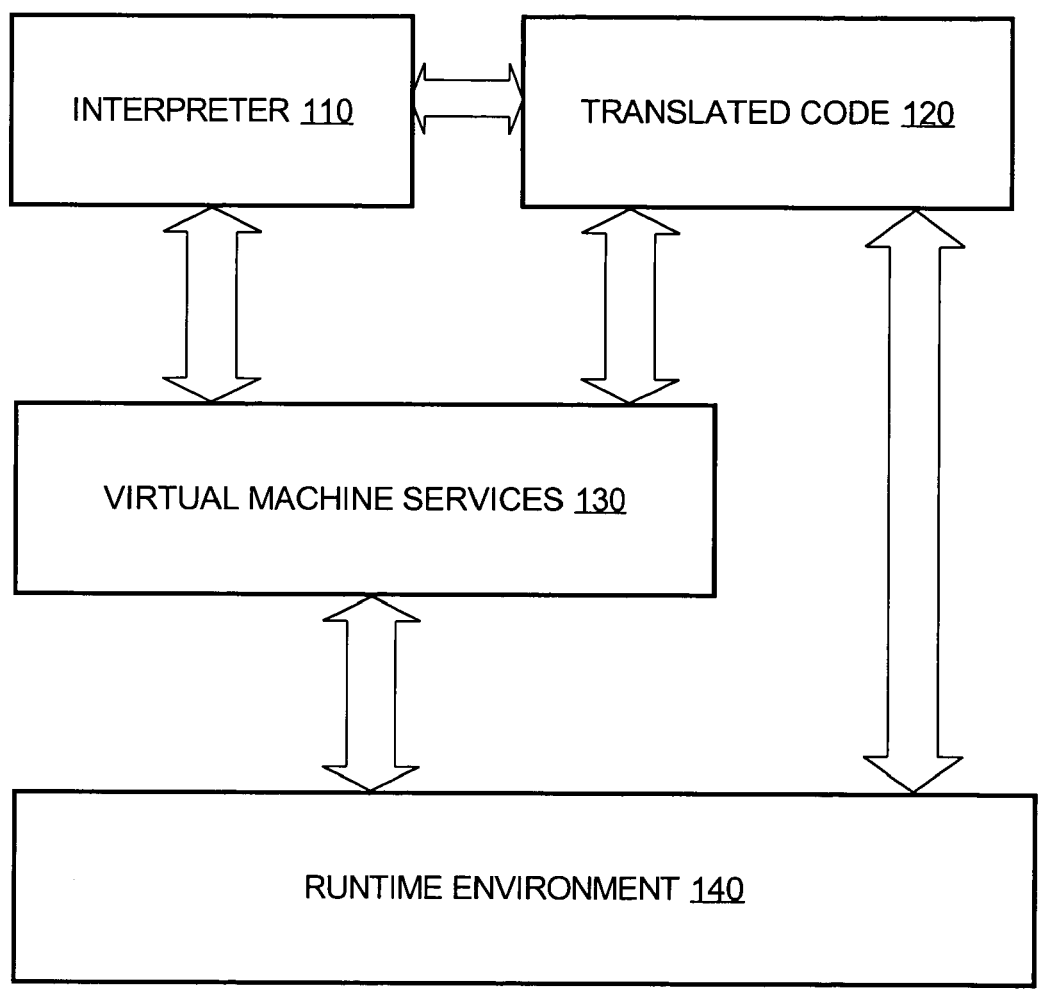
FIG. 1 is a conceptual diagram depicting components a virtual machine architecture in accordance with one embodiment of the present invention.

FIG. 1 is a conceptual diagram depicting components a virtual machine architecture in accordance with one embodiment of the present invention. The virtual machine architecture includes a virtual machine code interpreter 110 for interpreting the instructions of the virtual machine. For example, a Java virtual machine interpreter is responsible for interpreting Java byte codes.

With native compilation, a native compiler produces translated code 120, which is also loaded in the virtual machine. Preferably, the translated code 120 is configured to interact with the interpreter 110 to support an execution model that mixes byte-interpreted and natively compiled classes. Thus, routines in the translated code 120 may call routines that are interpreted and interpreted routines may call translated code 120 routines, thereby providing call interoperability. In one implementation, calls to or from interpreted routines use the stack discipline of the interpreter 110, while calls that are internal to the translated code 120 use a fast, open-coded C calling convention.

Virtual machine services 130 are provided for supplying such services as dynamic memory management and garbage collection. These services may require context parameters or handles to be passed from the interpreter 110 to control memory allocation and disposal as well as providing support for caching and exception handling. Accordingly, the translated code 120 are also generated to use the same API of the virtual machine services 130 by passing the context parameter or handle to the routines of the virtual machine services 130.

The run-time environment 140 provides the base functionality of the virtual machine, interfacing with the underlying operating system and relational database system. The run-time environment 140 may also include a meta-object system such as that described in the commonly assigned, co-pending U.S. patent application Ser. No. 09/515,887 entitled "Static Object System and Methodology for Implementing a Run-Time Environment" filed on May 29, 2000 by Harlan Sexton et al., the contents of which are hereby incorporated by reference in their entirety. Accordingly, the translated code 140 is also configured to interact with the run-time environment 140 in the same way as the virtual machine services 130, for example by laying out objects in the same way and using the same meta-object system.

Fragile Compilation of Virtual Machine Code

Figure 2:
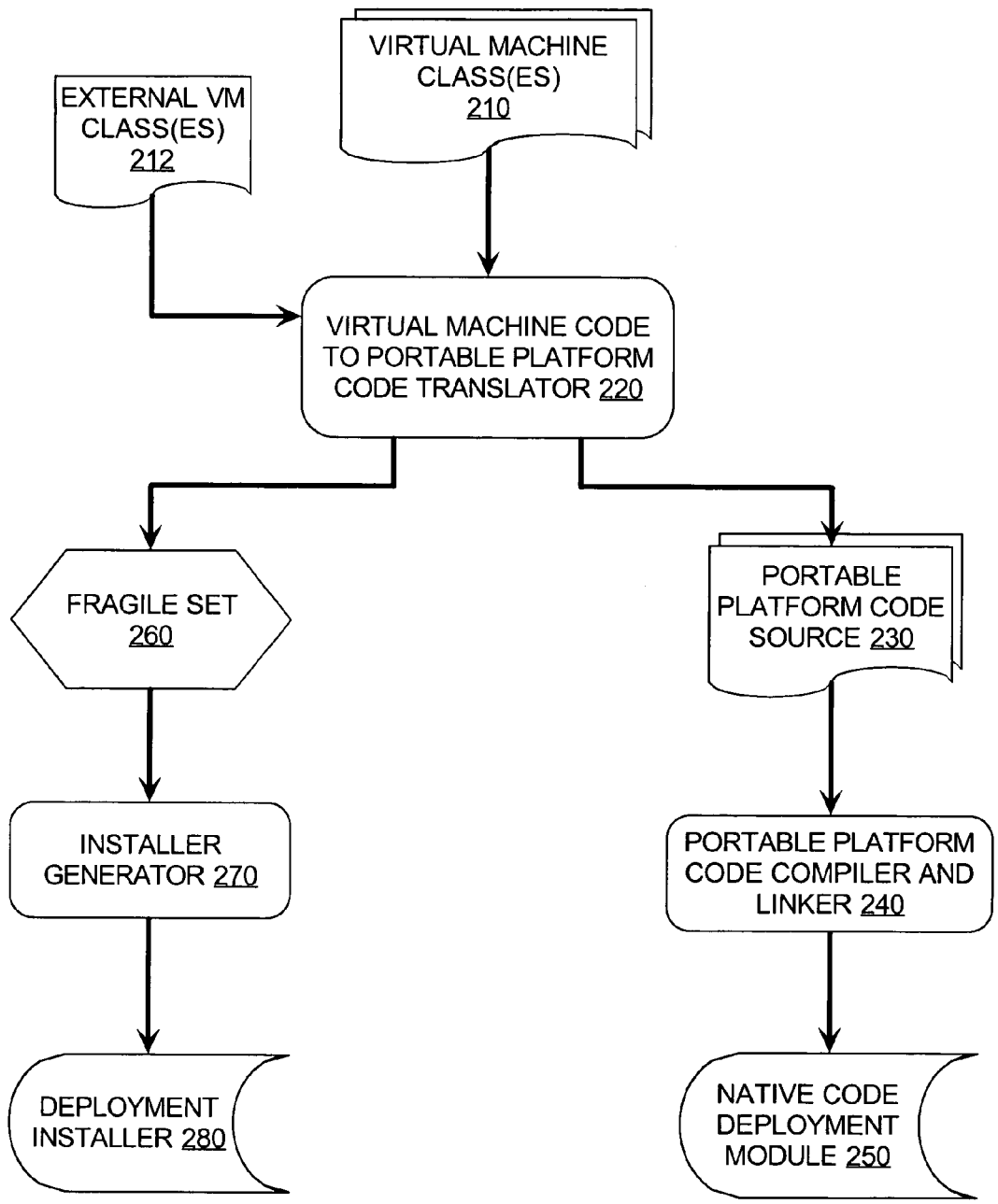
FIG. 2 is a dataflow diagram illustrating an example of fragile compilation of virtual machine code in accordance with one embodiment of the present invention.

FIG. 2 is a dataflow diagram illustrating the operation of fragile compilation of virtual machine code in accordance with one embodiment of the present invention. Execution of fragile compilation begins by specifying a set of one or more virtual machine entities 210 such as a Java class that the user desires to be compiled into native code. There are many ways to specify the virtual machine entities to compiles, for example by specifying the name of a library or other code module that include a set of Java classes or by simply listing the classes, functions, routines, source files, etc. The present invention, of course, is not limited to any particular way of specifying the virtual machine entities 210.

Upon invocation, a native compiler 220 translates the virtual machine code of the virtual machine entities into portable platform code, for example, C code. Preferably, the virtual machine entities (objects, methods, and classes) have already been compiled into virtual machine code and are resident in the virtual machine or relational database. Virtual machine code that is loaded and resident in a virtual machine can be trusted with correct execution semantics because the virtual machine code had already been resolved and verified by the virtual machine.

During compilation of the specified virtual machine entities, the native compiler 200 applies control and data flow analysis techniques to the virtual machine code, producing target code 230, preferably in a portable platform programming language such as C. In one implementation, the target code that the native compiler 220 emits resembles little of the original Java bytecodes and looks like human-written C code. The target code 230, however, does not bear the overhead associated with virtual machine code interpretation, because the target code is compiled into native code. For example, the stack-oriented architecture of Java virtual machine instructions such as push and pop may be translated into faster register transfer logic.

When translating virtual machine code to portable platform code 230, the native compiler 220 has several opportunities for optimizations, some of which are unavailable to just-in-time compilers that work only at the method or routine level. For example, the native compiler 220 can perform fragile code generation that computes at compile time performance-critical properties of Java classes and other virtual machine entities 212, such as instance layouts and virtual method table layout. For example, the structure of base classes and virtual method tables (in 212) can be inspected and open coded when derived classes (in 210) are compiled. With these fragile compilation assumptions, instance layout is computed, at compile time, for any class whose instance field is accessed, and virtual method table layout is computed for any class whose virtual method is invoked at a polymorphic call site. To compute the layouts, the native compiler 220 may employ class hierarchy analysis (CHA) techniques, inspecting properties of classes along inheritance paths. Thus, by moving code and data structure invariants from base classes to derived classes, target code 230 can be generated to access the instance layouts of base classes and virtual method table layouts with the comparable efficiency of C++ code.

Other kinds of optimizations that can be employed includes, for example, inter-procedural analysis of a large group of classes statically at compile time, to identify cases of polymorphic method dispatch and resolve those calls into a lower overhead, monomorphic dispatch. If the call is intra-module, monomorphic calls with the Java virtual machine calling convention can be replaced by the faster C calling convention, thereby allowing native code to execute directly on the C stack and avoid use of the Java virtual machine method frames. Alternatively, the native compiler can also inline small methods in place of monomorphic call sites, triggering further optimizations and code improvements. The native compiler 220 may also emit data structures that enable the caching of results of run-time method dispatch. The resulting portable platform code 230 (e.g. C code) is compiled and linked (240) in form a machine code deployment module 250, such as a dynamic link library (DLL), shared object library, or other archive of native code.

During compilation, the native compiler 220 also records, in a fragile set 260, the properties of external classes and other virtual machine entities 212 that were used in the native compiler's 220 fragile compilation assumptions. The fragile set 260 identifies not only the name the virtual machine entity 212 (e.g. Java base class) but also its version, for example, by storing a checksum, timestamp, or version identifier of the virtual machine entity. In addition, the fragile set 260 may also record the property of the external virtual machine entity 212 that was used, e.g. base class instance layout, virtual method table layout, etc.

Accordingly, the fragile set can identify those entities whose changes would "invalidate" the natively compiled code version, i.e. render the natively compiled code version out of synch and potentially incorrect from the interpreted version installed on a server. In particular, almost any change to an entity that contributes virtual machine code to the module would necessitate invalidation, but for external entities, which only contribute instance layout or method call-related layout information, only those changes upon those properties which the native compiler makes assumptions requires invalidation. For example, in one implementation, a checksum on the entire Java class is used if the class contributes byte codes to the compiled module (e.g. the class is part of the module or the class is external but has code that was inlined). On the other hand, if the class still a member of the fragile set but is only used for computing layouts and other non-byte-code contributing reasons, then it is sufficient to check that the class exposes the same fields and methods (sometimes referred to as the "class signature") as before for invalidation purposes. Thus, for such "layout givers" it is sufficient to check the checksums of only their signatures. Use of a checksum on the class signature of layout givers provides an advantageous of significantly reducing the number of invalidated/rejected module upon loading.

The fragile set 260 is processed by an installer generator 270 to produce a deployment installer 280 that is associated with the native code deployment module 250. For example, in one implementation, the installer generator 270 produces a Java class that includes all the information in the fragile set 260, e.g. the name, identity, and property of each external virtual machine entity that was used. The combination of the deployment installer 280 and the native code deployment code 250 can then be used to load native code into a virtual machine environment safely.

Moreover, one embodiment of the present invention allows for several modules to be deployed in a single deployment jar, each with its fragile set. In this embodiment, the module is a unit of "monolithicness," for which several classes are compiled together, but not necessary all of the classes. Typically, one module would correspond to a Java package. More specifically, because a typical application has more than one Java package, each package would become a module, each with its own fragile set. Thus, during compilation, if a user has requested to natively compile a large set of classes, the compiler can divide the classes based on modules. Each module is then compiled separately, and, if for any reason one of the modules cannot be natively compiled, the others can still be created.

Deployment of Fragile sets of Native Code

Figure 3:
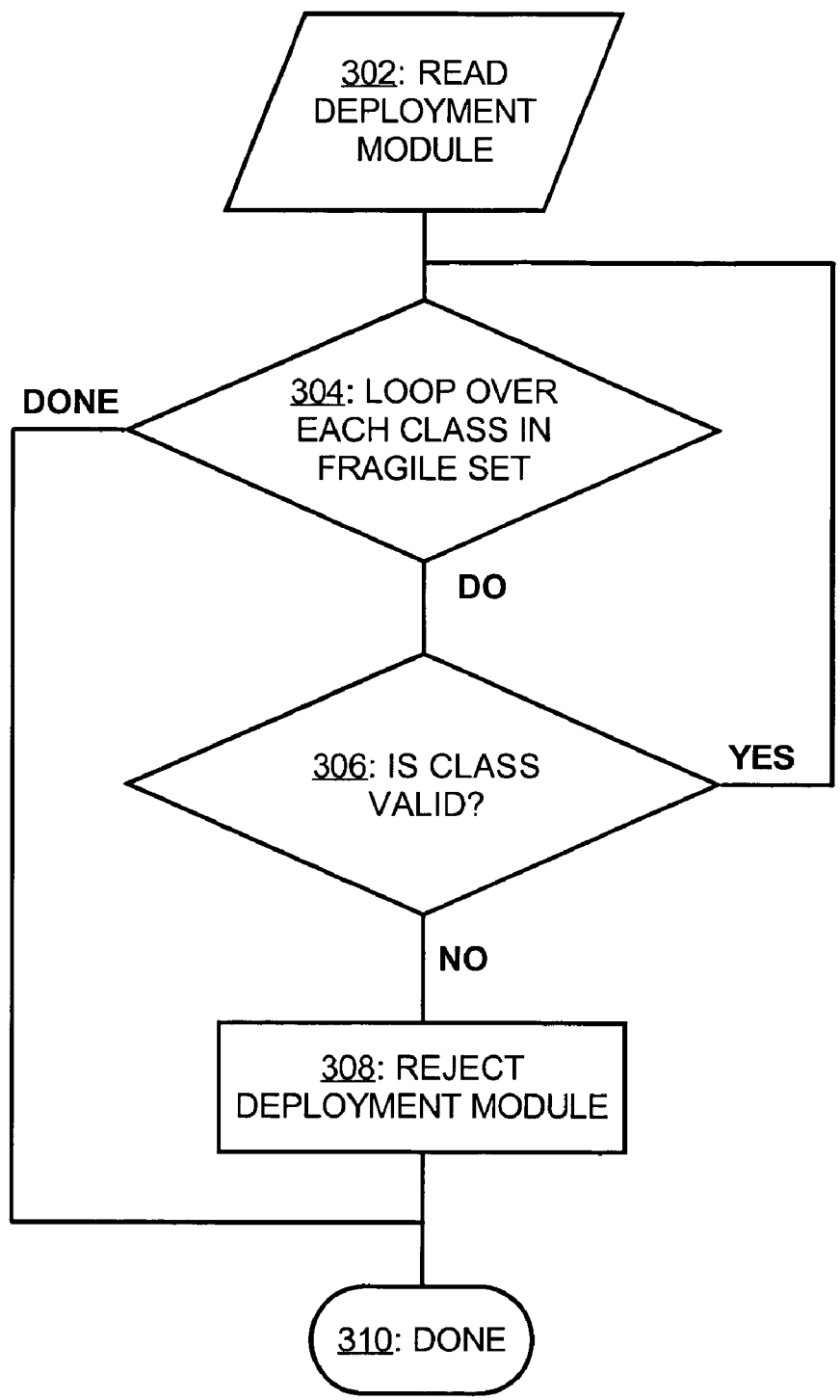
FIG. 3 is a flowchart illustrating an example of loading a fragile set into a virtual machine execution environment in accordance with one embodiment of the present invention.

FIG. 3 is a flowchart illustrating an example of loading a fragile set into a virtual machine execution environment in accordance with one embodiment of the present invention. At step 302, the deployment module 250 is read in and the deployment installer 280 is executed. If the deployment installer 280 is implemented as a Java class, then the installer class is read in and one of its methods, such as "run," is invoked to perform steps 304 through 310 as follows.

At step 304, each class in the fragile set 260 is iterated over, checking to see if the class named and identified in the fragile set 260 is valid on the destination virtual machine system (step 306). Various techniques may be employed to determine if a class in the fragile set 260 is valid, depending on the information recorded in the fragile set 260. For example, if the fragile set 260 records a checksum of each base class that was used, then the validity check compares the checksum in the fragile set 260 with a checksum of the class that is currently loaded into the virtual machine. If the checksums equal, then the class is valid; otherwise, if the checksums do not match, then the class is invalid. In one implementation, either a class checksum or a layout checksum are employed, depending on whether the class contributes byte codes or merely layout information. In such an implementation, invalidation occurs if the appropriate checksum (class or signature) does not the corresponding type of checksum in the loaded class.

If the class is invalid at step 306, then the deployment module 250 is rejected in step 308, preventing an incorrect and unsafe module from being loaded and causing the virtual machine to default back to interpreting the virtual machine code version. When one of the fragile classes is invalid, a fragile assumption such as the layout of a base class is incorrect for the deployment module 250. Therefore, rejecting such a deployment with incorrect native code prevents incorrect code from being executed, in contrast with some monolithic compilers. Otherwise, if the class is valid at step 306, execution loop back to step 304, where the next fragile entity is inspected for validity on the system, until all of the fragile entities are done (step 310).

In an embodiment in which several modules are deployed together in a single deployment jar, each deployment jar contains the installers (implemented as Java classes, for example) and the native libraries, which are stored as JAR RESOURCES. After the deployment jar is loaded onto the target server, the Java code in the deployment jar is executed and deployment for each module is performed in accordance with the steps illustrated in FIG. 3. Typically, an application will have more than one Java package wherein each Java package corresponds to a module and has its own fragile set. When the modules/Java packages are loaded and if one module is rejected, the others module can still be loaded and enabled.

To further ensure the safety of native code loaded in the virtual machine, the virtual machine may be configured to keep track of dependencies between the virtual machine entities (such as Java classes) loaded into the virtual machine. If any of the dependents of a class, for example the base class of a derived class, is changed or reloaded, then the class itself is invalidated, causing the virtual machine to default back to interpreting the virtual machine code version of the class. Thus, if a class that was natively compiled employs a base class that was changed, the natively compiled class is invalidated, and the virtual machine code version of the class is used for interpretation.

Hardware Overview

Figure 4:
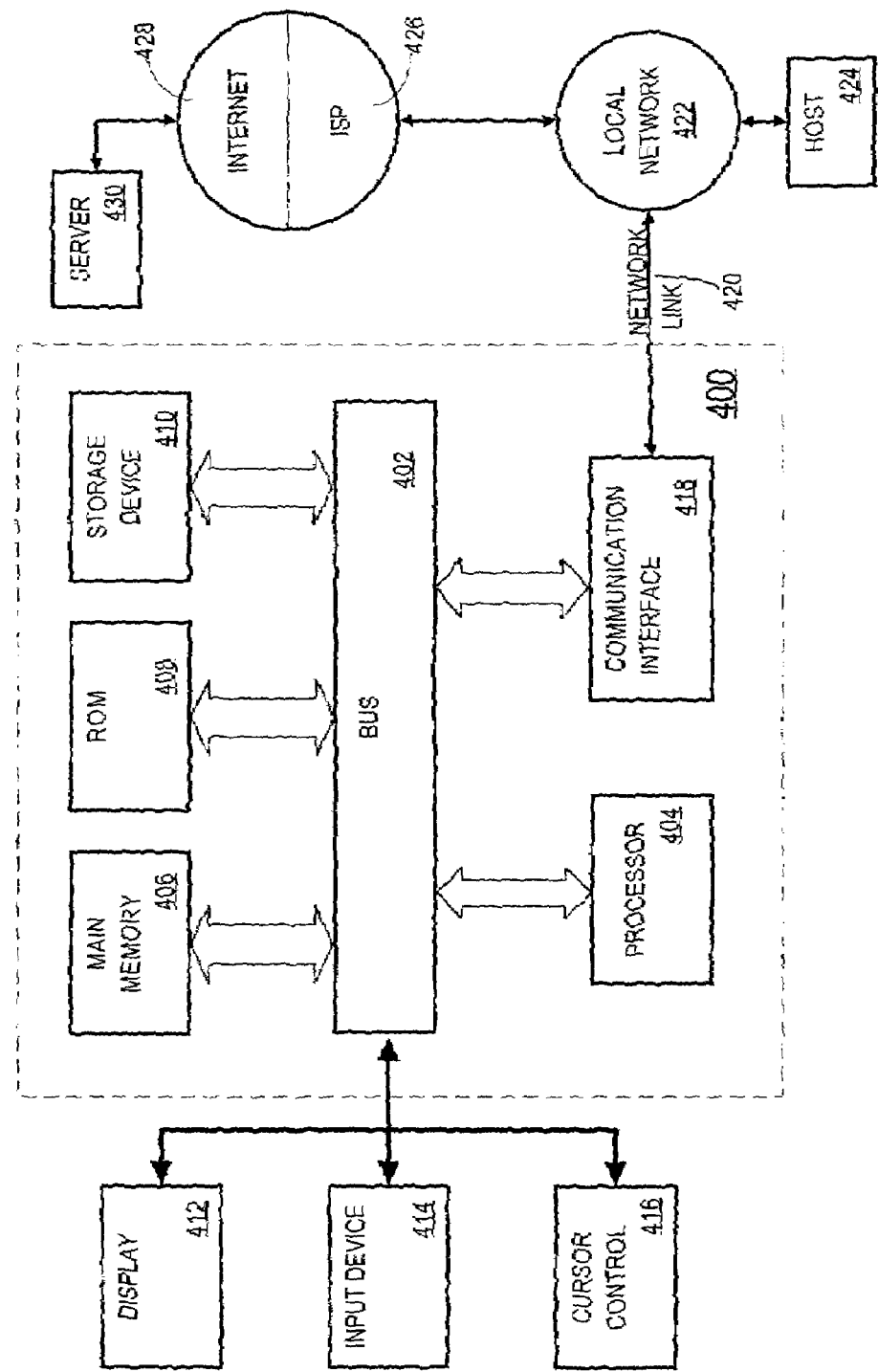
FIG. 4 depicts a computer system that can be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for native compilation of virtual machine code. According to one embodiment of the invention, native compilation of virtual machine code is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media include, for example, optical or magnetic disks, such as storage device 410. Volatile media include dynamic memory, such as main memory 406. Transmission media include coaxial cables, copper wire and fiber optics, including the wires that comprise bus 402. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be borne on a magnetic disk of a remote computer. The remote computer can load the instructions into its dynanic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network, now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420, and communication interface 418. In the Internet example, a server 430 might transmit a requested code for an application program through Internet 428, ISP 426, local network 422 and communication interface 418. In accordance with the invention, one such downloaded application provides for native compilation of virtual machine code as described herein. The core may be executed by processor 404 as it is received, and/or stored in storage device 410, or other non-volatile storage for later execution. In this manner, computer system 400 may obtain application code in the form of a carrier wave.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of compiling virtual machine code into native code, comprising the steps of:
   compiling the virtual machine code into the native code, including optimizing the native code based on a property of an external virtual machine entity that is outside of the virtual machine code;
   recording an indication of the external virtual machine entity; and
   constructing instructions for deploying the native code based on the recorded indication of the external virtual machine entity, wherein said instructions for deploying the native code, when executed within a run-time environment, cause one or more processors to perform the steps of:
      determining whether the native code is compatible in the run-time environment based on the recorded indication of the external virtual machine entity;
      if the native code is compatible, then loading the native code into the run-time environment; and
      if the native code is not compatible, then rejecting the native code.

2. The method according to claim 1, wherein the indication of the external virtual machine entity indicates the property of the external virtual machine entity.

3. The method according to claim 1, wherein the indication of the external virtual machine entity includes a checksum of the bytes of the external virtual machine entity.

4. A method of compiling a class into native code, comprising the steps of:
   compiling the class code into the native code, including optimizing the native code based on an external class outside of the class;
   recording an indication of the external class in a fragile set; and
   constructing instructions for deploying the native code based on the fragile set, wherein said instructions for deploying the native code, when executed within a run-time environment, cause one or more processors to perform the steps of:
      determining whether the native code is compatible in the run-time environment based on the fragile set;
      if the native code is compatible, then loading the native code into the run-time environment; and
      if the native code is not compatible, then rejecting the native code.

5. The method according to claim 4, wherein the indication of the external class indicates the property of the external class.

6. The method according to claim 5, wherein the property includes a layout of an instance of the external class.

7. The method according to claim 5, wherein the property includes a layout of a virtual table.

8. The method according to claim 4, wherein the indication of the external class includes a checksum of the bytes of the external class.

9. The method according to claim 4, wherein the indication of the external virtual machine entity includes an indication of a signature of the external class or a checksum of the bytes of the external class.

10. The method according to claim 9, wherein:
    the indication of the signature of the external class is used only if the external class contributes layout information.

11. The method according to claim 9, wherein:
    the checksum of the bytes of the external class is used if the external class contributes virtual machine code.

12. A method of loading a native code module from a deployment module into a run-time environment executing virtual machine code, comprising the steps of:
    determining whether the native code is compatible with an external virtual machine entity that is included in the virtual machine code in the run-time environment;
    if the native code is compatible, then loading the native code into the run-time environment; and
    if the native code is not compatible, then rejecting the native code.

13. The method according to claim 12, wherein the step of determining whether the native code is compatible with the external virtual machine entity includes the steps of:
    accessing an indication of the external virtual machine entity that is associated with the deployment module; and
    determining whether the native code is compatible with the external virtual machine entity based on the indication of the external virtual machine entity.

14. The method according to claim 13, wherein the indication of the external virtual machine entity indicates a property of the external virtual machine entity.

15. The method according to claim 13, wherein the indication of the external virtual machine entity includes a checksum of the bytes of the external virtual machine entity.

16. The method according to claim 13, wherein the indication of the external virtual machine entity includes an indication of a signature of the external virtual machine entity or a checksum of the bytes of the external virtual machine entity.

17. The method according to claim 16, wherein:

the indication of the signature of the external virtual machine entity is used only if the external virtual machine entity contributes layout information.

18. The method according to claim 16, wherein:

the checksum of the bytes of the external virtual machine entity is used if the external virtual machine entity contributes virtual machine code.

19. The method according to claim 12, further comprising the step of activating an interpreted version of the native code, if the native code is not compatible.

20. The method according to claim 12, wherein the deployment module includes instructions for deploying the native code.

21. A computer non-volatile or volatile readable medium bearing instructions for compiling virtual machine code into native code, said instructions being arranged, upon execution by one or more processors, to cause the one or more processors to perform the steps of the method according to claim 1.

22. A computer readable non-volatile or volatile medium bearing instructions for loading a native code module from a deployment module into a run-time environment executing virtual machine code, said instructions being arranged, upon execution by one or more processors, to cause the one or more processors to perform the steps of the method according to claim 4.

* * * * *